United States Patent
Koizumi

(10) Patent No.: US 6,462,676 B1
(45) Date of Patent: Oct. 8, 2002

(54) MAP DISPLAYING APPARATUS AND MAP DISPLAYING METHOD

(75) Inventor: Isao Koizumi, Tokyo-to (JP)

(73) Assignees: Pioneer Corporation, Tokyo (JP); Increment P Corporation, Tokyo (JP)

(*) Notice: Subject to any disclaimer, the term of this patent is extended or adjusted under 35 U.S.C. 154(b) by 0 days.

(21) Appl. No.: 09/696,939

(22) Filed: Oct. 27, 2000

(30) Foreign Application Priority Data

Oct. 29, 1999 (JP) .......................................... 11-308352

(51) Int. Cl.[7] .............................................. G08G 1/123
(52) U.S. Cl. ...................... 340/995; 701/200; 701/207; 701/209; 701/212; 701/213
(58) Field of Search ................................ 340/995, 990, 340/988; 701/200, 201, 202, 208, 209, 210, 211, 212

(56) References Cited

U.S. PATENT DOCUMENTS

| | | | | |
|---|---|---|---|---|
| 4,527,155 A | * | 7/1985 | Yamaki et al. ............... | 345/126 |
| 4,550,317 A | * | 10/1985 | Moriyama et al. ........... | 340/995 |
| 4,571,684 A | * | 2/1986 | Takanabe et al. ............ | 701/200 |
| 5,031,104 A | * | 7/1991 | Ikeda et al. .................. | 701/209 |
| 5,442,557 A | * | 8/1995 | Kaneko ........................ | 701/213 |
| 5,617,319 A | * | 4/1997 | Arakawa et al. ............. | 701/207 |
| 6,006,161 A | * | 12/1999 | Katou ........................... | 701/212 |

FOREIGN PATENT DOCUMENTS

| | | | | |
|---|---|---|---|---|
| JP | 02010216 | 1/1990 | ........... | G01C/21/00 |
| WO | WO 98 05019 | 2/1998 | ........... | G09B/29/10 |

* cited by examiner

*Primary Examiner*—John Tweel
(74) *Attorney, Agent, or Firm*—Finnegan, Henderson, Farabow, Garrett & Dunner, L.L.P.

(57) ABSTRACT

A map displaying apparatus is provided with: a memory device for storing map data including road data and name data; a map displaying device for displaying a map within a map display range by using the map data; a point determining device for determining one point or a plurality of points within the map display range; and a searching device for extracting the name data related to the specified point or points by searching the map data stored in the memory device. The map displaying apparatus is also provided with a name displaying device for displaying the extracted name data by superimposing the extracted name data on the map displayed by the map displaying device.

20 Claims, 10 Drawing Sheets

FIG. 3A

NODE TABLE

| NODE NO. | LATITUDE | LONGITUDE |
|---|---|---|
| 1 | x1 | y1 |
| 2 | x2 | y2 |
| 3 | x3 | y3 |
| 4 | x4 | y4 |
| 5 | x5 | y5 |
| 6 | x6 | y6 |
| . | . | . |
| . | . | . |
| 10 | x10 | y10 |
| 11 | x11 | y11 |
| 12 | x12 | y12 |
| 13 | x13 | y13 |
| . | . | . |
| . | . | . |

FIG. 3B

LINK TABLE

| LINK POSITION INFORMATION | | | ATTRIBUTE | | |
|---|---|---|---|---|---|
| LINK NO. | START POINT | END POINT | LENGTH | THE NUMBER OF LANES | ONE WAY |
| . | . | . | . | . | . |
| . | . | . | . | . | . |
| 20 | 10 | 11 | 15.3 | 3 | — |
| 22 | 12 | 13 | 20.4 | 3 | — |
| . | . | . | . | . | . |
| . | . | . | . | . | . |

FIG. 4A

FACILITY NAME TABLE

| FACILITY NAME | GENRE | LATITUDE | LONGITUDE | ADDRESS | TELEPHONE NO. |
|---|---|---|---|---|---|
| SAN-AI | SHOP | x2 | y2 | ○○○ | ××× |
| WAKO | SHOP | x3 | y3 | ○○○ | ××× |
| YAMANO INSTRUMENT | | x4 | y4 | ○○○ | ××× |
| NISSAN GALLERY | | x5 | y5 | ○○○ | ××× |
| GINZA MITSUKOSHI | | x6 | y6 | ○○○ | ××× |
| . | . | . | . | . | . |

FIG. 4B

PLACE NAME TABLE

| PLACE NAME | NODE NO. | LINK NO. |
|---|---|---|
| CENTRAL STREET | 2、3、4、... | 22 |
| SINBASHI | 12 | |
| KYOBASHI | 13 | |
| GINZA 4-CHOME | 1 | |
| HARUMI | 11 | |
| HARUMI STREET | 1 | 20 |

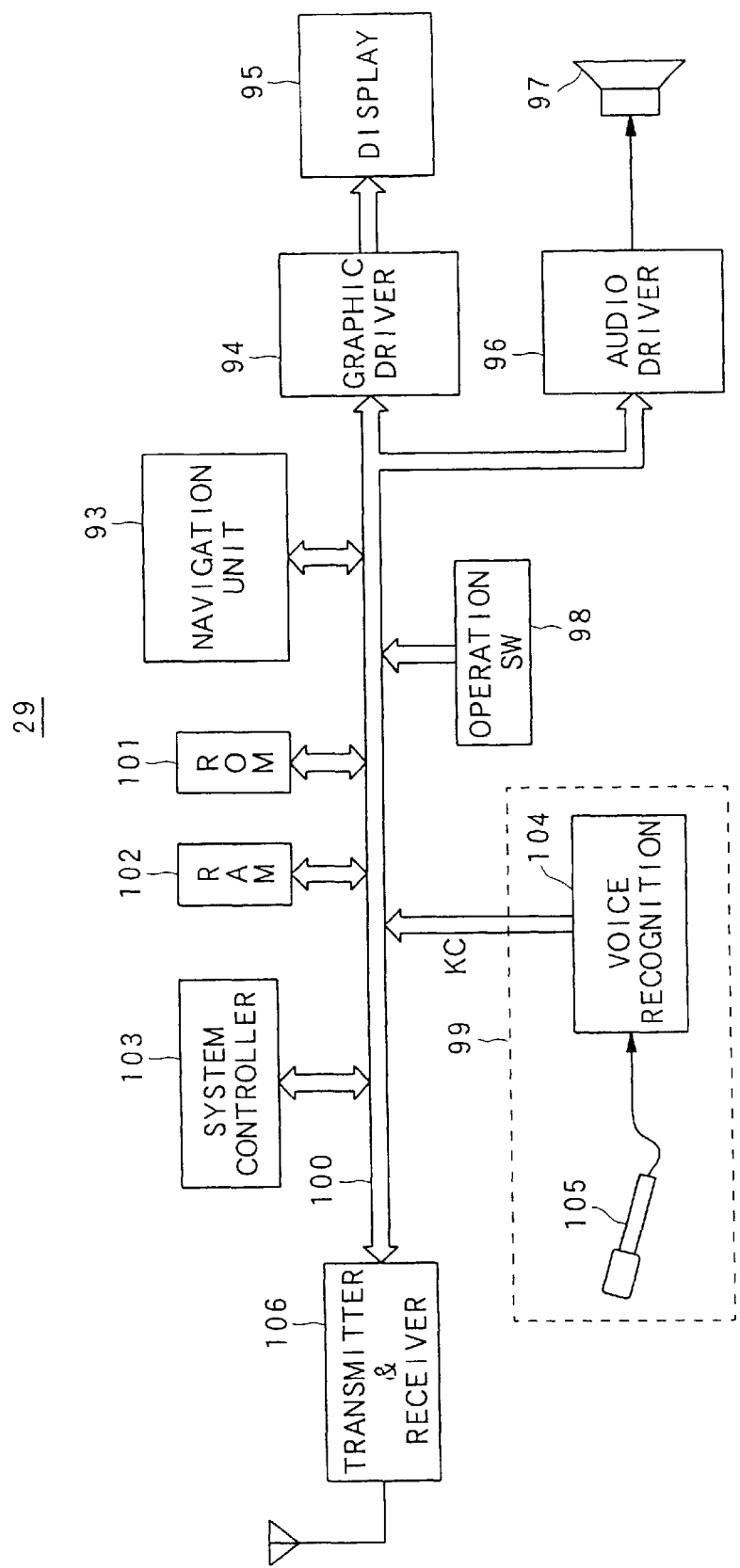

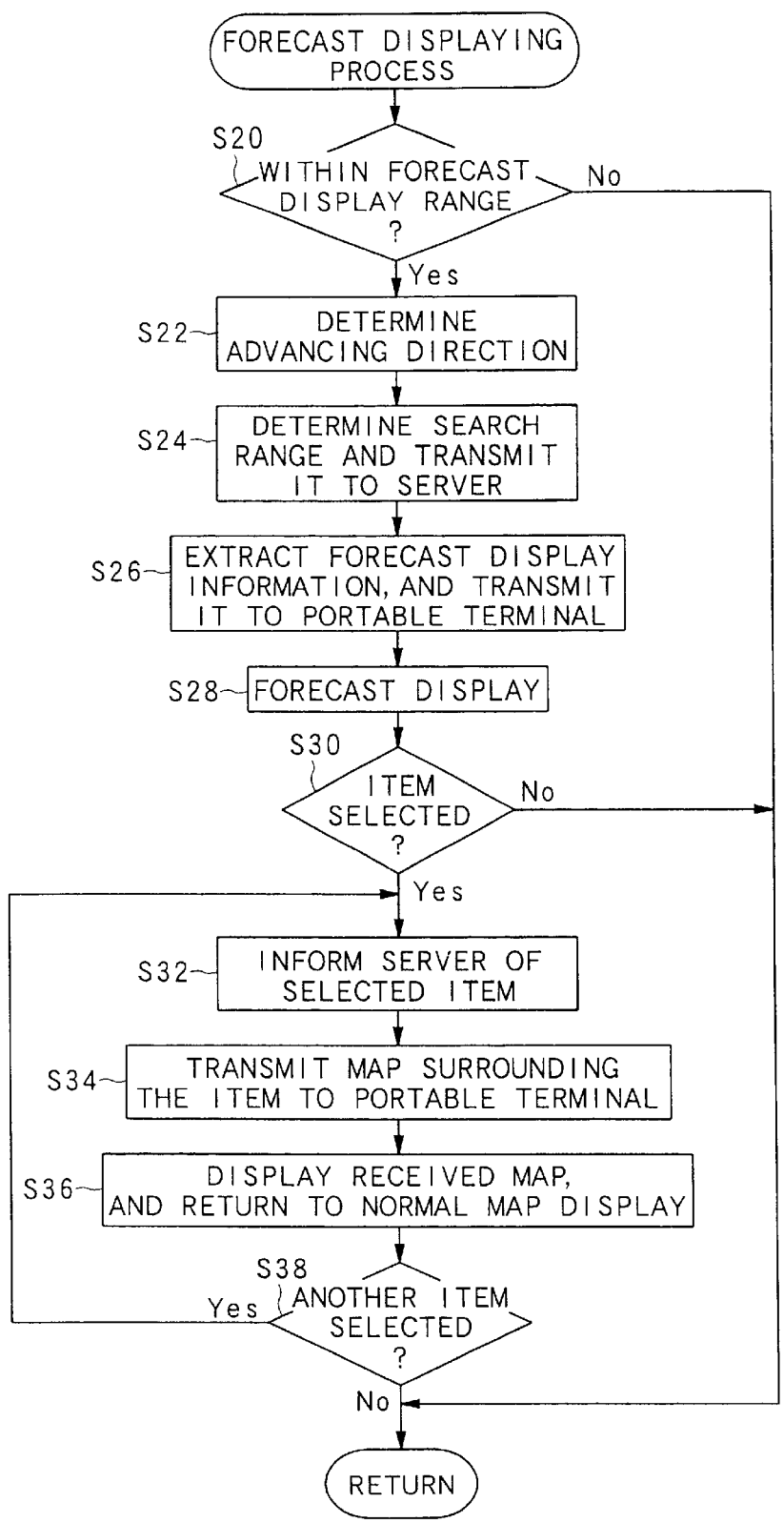

MAP DISPLAYING APPARATUS AND MAP DISPLAYING METHOD

BACKGROUND OF THE INVENTION

1. Field of the Invention

The present invention relates to a method of and an apparatus for supplying a user with map information including a present position of the user.

2. Description of the Related Art

There is an on-vehicle type navigation apparatus as an apparatus for supplying the present position of the user and the map information around it in real time, for example.

However, the on-vehicle type navigation apparatus displays the map information around the present position of the self vehicle. Thus, in order to know what kind of area or what kind of facility will exist in the advancing direction of the self vehicle, it is required for the user to operate the navigation apparatus so as to display the map information in that direction. Namely, it is difficult or impossible for the user to easily know the area, the facility or the like in the advancing direction of the self vehicle.

SUMMARY OF THE INVENTION

It is therefore an object of the present invention to provide a map displaying apparatus and a map displaying method, which can allow the user to easily know the place, the facility or the like existing in the currently advancing direction of the self vehicle.

The above object of the present invention can be achieved by a map displaying apparatus provided with: a memory device for storing map data including road data and name data; a map displaying device for displaying a map within a map display range by using the map data; a point determining device for determining one point or a plurality of points within the map display range; a searching device for extracting the name data related to the specified point or points by searching the map data stored in the memory device; and a name displaying device for displaying the extracted name data by superimposing the extracted name data on the map displayed by the map displaying device.

According to the map displaying apparatus of the present invention, the map displaying device displays the map within the map display range by using the map data stored in the memory device. Then, when one point on the displayed map is determined by the point determining device, the searching device searches the name data related to this determined point, and then the name displaying device displays the extracted name by superimposing it on the displayed map. Therefore, when the point is determined on the displayed map, the name related to the point can be displayed, so that the user can easily recognize the name of a facility, the name of a place or the like related to the point.

In one aspect of the map displaying apparatus of the present invention, the apparatus is further provided with a name specifying device for specifying one of the name data displayed by the name displaying device, wherein when one of the name data is specified by the name specifying device, the map displaying device displays the map around a point corresponding to the specified name.

According to this aspect, the user can speedily and easily watch the map around the point corresponding to the specified name.

In another aspect of the map displaying apparatus of the present invention, the apparatus is further provided with a present position detecting device for continuously detecting a present position of the map displaying apparatus, wherein the map displaying device displays a present position mark indicating the detected present position by superimposing the present position mark on the map, and automatically updates the present position mark.

According to this aspect, the user can grasp the present position on the displayed map.

In this aspect having the present position detecting device, the map display range may be determined on the basis of the detected present position.

By constituting in this manner, the user can always grasp the present position on the displayed map.

In this aspect having the present position detecting device, the point determining device may determine as the point the detection present position when the detected present position enters a predetermined peripheral portion of the map display range.

By constituting in this manner, the user can recognize the name of the facility or the place related to the point when the present position approaches a point corresponding to the peripheral portion of the displayed map.

Also in this aspect having the present position detecting device, the searching device may extract the name data included within a search range determined on the basis of the detected present position and an advancing direction of the detected present position.

By constituting in this manner, the user can easily recognize the name of the facility or place, which is located in the currently advancing direction, to thereby check the advancing direction.

In another aspect of the map displaying apparatus of the present invention, the point determining device is provided with a point specifying device through which an arbitrary point within the map display range and an arbitrary direction can be specified.

According to this aspect, it is possible to easily display the name of the point specified by the user.

In this aspect having the point specifying device, the searching device extracts the name data included in a search range determined on the basis of the point and the advancing direction specified through the point specifying device.

By constituting in this manner, the user can easily recognize the name of the facility or place, which the user may reach, as the user advances in a specific direction from a specific point.

In another aspect of the map displaying apparatus of the present invention, the map data comprises: node data indicating a point on the map; link data as the road data indicating a road on the map; and the name data indicating a name of a facility and a name of a place in correlation with the node data and the link data.

According to this aspect, it becomes possible to easily search and extract the name of the facility or place related to the point or place on the map.

The above object of the present invention can be also achieved by a map displaying method provided with: a map displaying process of displaying a map within a map display range by using map data stored in a memory device for storing the map data including road data and name data; a point determining process of determining one point or a plurality of points within the map display range; a searching process of extracting the name data related to the specified point or points by searching the map data stored in the memory device; and a name displaying process of displaying the extracted name data by superimposing the extracted name data on the map displayed by the map displaying process.

According to the map displaying method of the present invention, the map displaying process displays the map within the map display range by using the map data stored in the memory device. Then, when one point on the displayed map is determined by the point determining process, the searching process searches the name data related to this determined point, and then the name displaying process displays the extracted name by superimposing it on the displayed map. Therefore, when the point is determined on the displayed map, the name related to the point can be displayed, so that the user can easily recognize the name of a facility, the name of a place or the like related to the point.

In one aspect of the map displaying method of the present invention, the method is further provided with a name specifying process of specifying one of the name data displayed by the name displaying process, wherein when one of the name data is specified by the name specifying process, the map displaying process displays the map around a point corresponding to the specified name.

According to this aspect, the user can speedily and easily watch the map around the point corresponding to the specified name.

In another aspect of the map displaying method of the present invention, the method is further provided with a present position detecting process of continuously detecting a present position, wherein the map displaying process displays a present position mark indicating the detected present position by superimposing the present position mark on the map, and automatically updates the present position mark.

According to this aspect, the user can grasp the present position on the displayed map.

In this aspect having the present position detecting process, the map display range is determined on the basis of the detected present position.

By constituting in this manner, the user can always grasp the present position on the displayed map.

In this aspect having the present position detecting process, the point determining process determines as the point the detection present position when the detected present position enters a predetermined peripheral portion of the map display range.

By constituting in this manner, the user can recognize the name of the facility or the place related to the point when the present position approaches a point corresponding to the peripheral portion of the displayed map.

Also in this aspect having the present position detecting process, the searching process extracts the name data included within a search range determined on the basis of the detected present position and an advancing direction of the detected present position.

By constituting in this manner, the user can easily recognize the name of the facility or place, which is located in the currently advancing direction, to thereby check the advancing direction.

In another aspect of the map displaying method of the present invention, the point determining process is provided with a point specifying process through which an arbitrary point within the map display range and an arbitrary direction can be specified.

According to this aspect, it is possible to easily display the name of the point specified by the user.

In this aspect, the searching process may extract the name data included in a search range determined on the basis of the point and the advancing direction specified through the point specifying process.

By constituting in this manner, the user can easily recognize the name of the facility or place, which the user reach, as the user advances in a specific direction form a specific point.

In another aspect of the map displaying method of the present invention, the map data comprises: node data indicating a point on the map; link data as the road data indicating a road on the map; and the name data indicating a name of a facility and a name of a place in correlation with the node data and the link data.

According to this aspect, it becomes possible to easily search and extract the name of the facility or place related to the point or place on the map.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3A is a diagram showing an example of a node table constituting the vector map data in the first embodiment;

FIG. 3B is a diagram showing an example of a link table constituting the vector map data in the first embodiment;

FIG. 4A is a diagram showing an example of a facility name table constituting the vector map data in the first embodiment;

FIG. 4B is a diagram showing an example of a place name table constituting the vector map data in the first embodiment;

FIG. 5 is a block diagram showing a structure of a portable terminal shown in FIG. 1;

FIG. 7 is a flowchart showing a forecast displaying process in the first embodiment;

DETAILED DESCRIPTION OF THE PREFERRED EMBODIMENTS

Referring to the accompanying drawings, embodiments of the present invention will be now explained.

Figure 1:
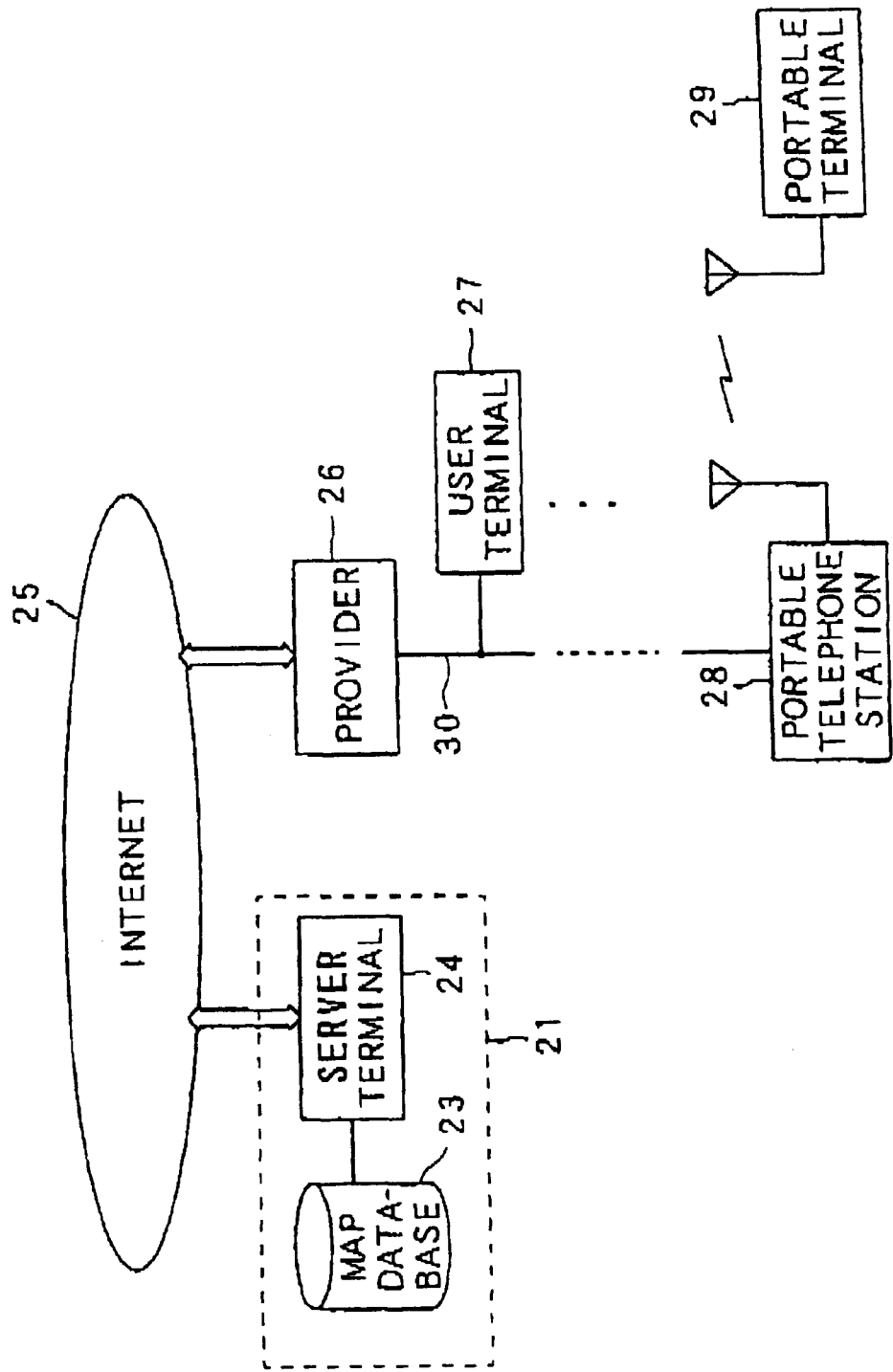
FIG. 1 is a block diagram showing a structure of a map information supplying system as a first embodiment of the present invention.

FIG. 1 shows a structure of a map information supplying system as a first embodiment of the present invention. This first embodiment relates to a system for supplying the map information while the user carries the portable terminal apparatus and moves.

In FIG. 1, a server 21 and a provider 26 are connected with each other through an internet 25. To the provider 26, a plurality of user terminals 27 and a portable telephone station 28 are connected through a telephone line 30. Further, the portable telephone station 28 can communicate with a portable terminal 29, which the user carries and uses, via a wireless communication.

The server 21 includes a map database 23 and a server terminal 24. In the map database 23, the map data is stored in the forms of various tables described later. The server terminal 24 has a function of accessing the map database 23 in response to a request from the user terminal 27 or the portable terminal 29 to thereby obtain the requested map data. The server terminal 24 also has a function to transmit the obtained map data to the user terminal 27 or the portable terminal 29, which is the origin of the request, the internet 25. Further, the server terminal 24 performs a "forecast displaying process" in the portable terminal 29 described later in detail.

Figure 2:
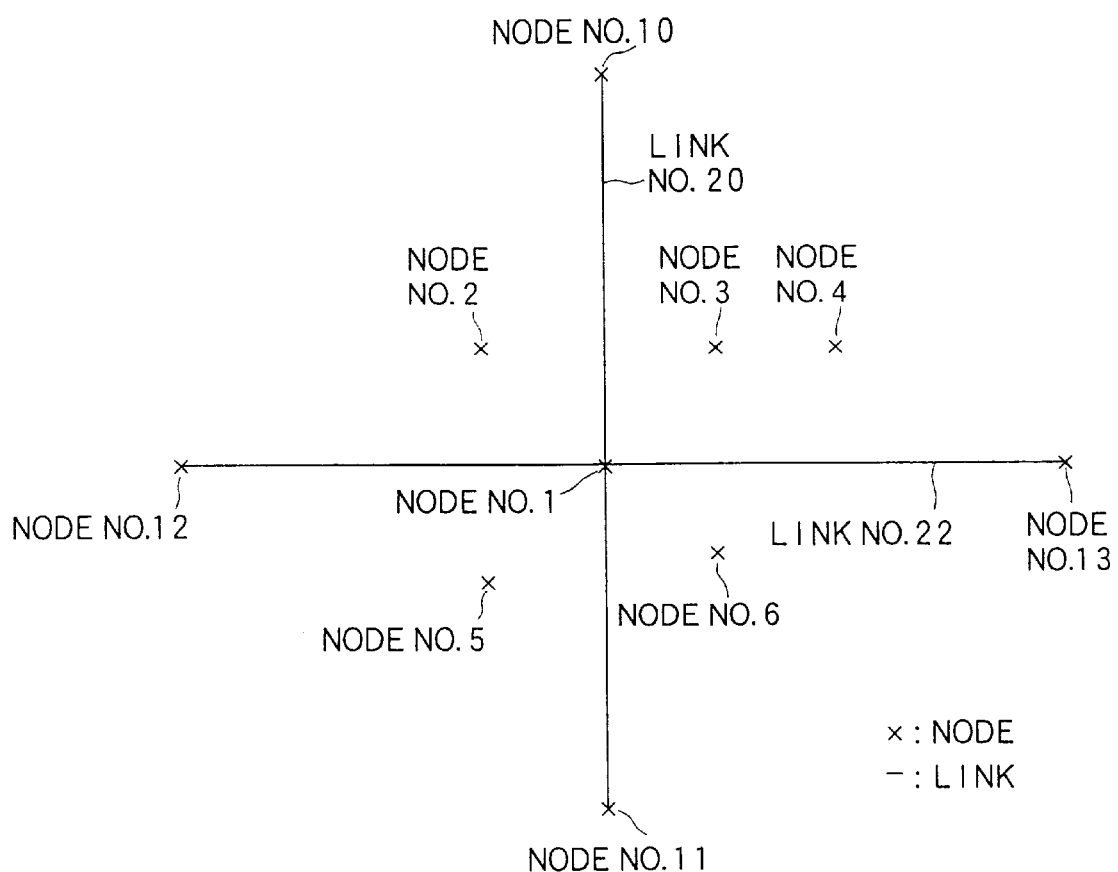
FIG. 2 is a diagram showing an example of an expression of map information by vector map data in the first embodiment.

Next, the map data stored in the map database 23 is explained with reference to FIG. 2 to FIG. 4B. In the present embodiment, the map database 23 stores the map data in the form of so-called "vector data". FIG. 2 shows an example of the map information indicated by vector map data as for a certain place, while FIG. 3A to FIG. 4B shows examples of the vector data constituting such vector map data.

The vector data of the map comprises a node table, a link table, a facility name table and a place name table respectively shown in FIG. 3A to FIG. 4B respectively. In the vector data, a point on the map is specified as a node while a road on the map is specified as a link.

Incidentally, in the present invention, a "place" means an area, a city, a region, a district, a region, a country, a place and so forth, to which a proper name is given.

As shown in FIG. 3A, the node table stores a plurality of points on the map as a plurality of nodes respectively, to each of which a node number (the node No. 1, the node No. 2, ...) is given. With respect to one node, the geographical coordinates (i.e., the latitude and the longitude) of this one node is stored in correlation with the node number.

As shown in FIG. 3B, the link table stores a plurality of roads on the map as a plurality of links respectively, to each of which a link number (the link No. 1, link No. 2, ...) is appended. The node number of a start point and the node number of an end point of the road is stored in correspondence with the link number. Further, with respect to each link number, attribute information of the road is stored. The attribute information includes information indicating the length of the road, the number of traffic lanes of the road, whether the road is one way or not and so forth, for example.

As shown in FIG. 4A, the facility name table stores the information related to a landmark, a building and the like to be displayed on the map. More concretely, as for each shop, each store, each landmark or the like, the information such as the genre information, the latitude and the longitude, the address, the telephone number and so forth are stored.

As shown in FIG. 4B, the place name table stores the names of a road, a district and the like to be displayed on the map, in correlation with the node and the link.

In the example shown in FIG. 2, there is a road (link) of the link No. 20 extending in the up and down direction in the figure, and a road (link) of the link No. 22 extending in the left and right direction in the figure. The roads corresponding to the link No. 20 and the link No. 22 are respectively stored at the link No. 20 and the link No. 22 in the link table in FIG. 3B. In the link table in FIG. 3B, the start point of the link No. 20 corresponds to the node No. 10 while the end point of the link No. 20 corresponds to the node No. 11. The start point of the link No. 22 corresponds to the node No. 12 while the end point of the link No. 20 corresponds to the node No. 13. The nodes of the node No. 1 to No. 6 indicate the target, the facility such as an intersection, a shop, a store and the like, the names related to which are stored in the facility name table shown in FIG. 4A. Also, in association with the nodes and the links include in FIG. 2, the place names shown in FIG. 4B are prepared.

Next, the structure of the portable terminal 29 is explained with reference to FIG. 5.

In FIG. 5, the portable terminal 29 is provided with a transmitter and receiver 106, a system controller 103, a RAM 102, ROM 101, a navigation unit 93, a voice input unit 99, an operation switch 98, a graphic driver 94 and an audio driver 96, which are connected to a system bus 100.

The transmitter and receiver 106 has an antenna to perform transmitting and receiving an electric wave with the portable telephone station 28 or the like through the antenna. The transmitter and receiver 106 demodulates the received electric wave, and transmits the demodulated signal onto the system bus 100. The transmitter and receiver 106 also demodulates various request signals supplied through the system bus 100, and transmits the demodulated signal in wireless.

The navigation unit 93 is mainly composed of GPS (Global Navigation System), and calculates an absolute position (i.e., the latitude and the longitude) of the portable terminal 29 by using the electric waves from artificial satellites for the positional measurement. Therefore, as the user carries the portable terminal 29 and moves, the navigation unit 93 continuously measures the present position of the user and updates the present position data.

The graphic driver 94 converts the map data received through the portable telephone station 28, the internet 25 etc., from the server 21, to image data and supplies it to the display 95. By this, the present position of the user, who carries the portable terminal 29, and the map information around the present position are displayed on the screen of the display 95.

The audio driver 96 converts voice data such as an alarm or warning, a message or the like generated during the execution of various functions of the portable terminal 29, to an analog voice signal, so that the speaker outputs it.

The operation switch 98 transmits various operation command signals, which correspond to the switching operations of the user respectively, onto the system bus 100.

The voice input unit 99 is provided with a microphone 105 and a voice recognition circuit 104. The microphone 105 generates a voice signal by converting a voice pronounced by the user, to an electric signal, and supplies it to the voice recognition circuit 104. If the signal waveform of the inputted voice signal coincides with that of one of predetermined operation commands prepared in advance, the voice recognition circuit 104 transmits an operation command signal corresponding to this operation command, onto the system bus 100. If the signal waveform of the inputted voice signal does not coincide with that of any one of the operation commands, the voice recognition circuit 104 converts the voice signal to a Kana (which is one of Japanese phonograms) expression code corresponding to the pronunciation of the voice signal, and supplies it as a Kana expression code KC onto the system bus 100.

The system controller 103 controls various processes executed by the portable terminal 29 on the basis of various programs, which are stored in the ROM 101 in advance. The processes of the portable terminal 29 include a "map displaying process" of displaying the present position of the user on the map information received from the server 21, and a "forecast displaying process" of displaying the name of the place and the name of the facility existing in the advancing direction of the user. The system controller 103 uses the RAM 102 as a work area when executing the control.

Figure 6:
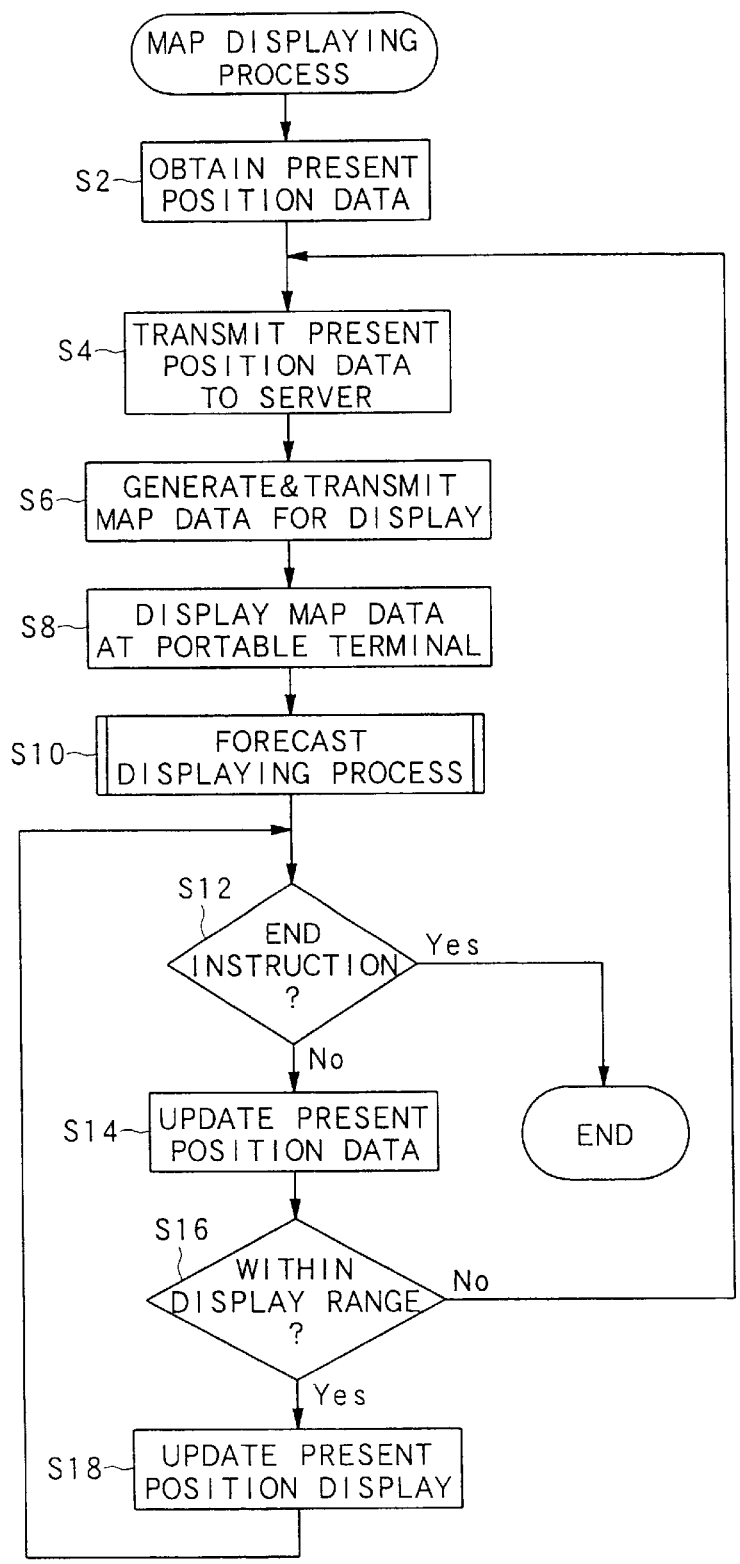
FIG. 6 is a flowchart showing a map displaying process in the first embodiment.

Next, the map displaying process executed by the portable terminal 29 is explained with reference to FIG. 6. The map displaying process is a process in which the portable terminal 29 receives the map data from the server 21 through the internet 25 on the basis of the present position of the portable terminal 29, and displays the received map data on the display 95.

At first, when the user instructs the start of the map displaying process by using the operation switch 98 or the voice input unit 99, the system controller 103 obtains the present position data from the navigation unit 93 (step S2). This present position data may be used as the coordinates data of the latitude and the longitude of the present position at the portable terminal 29. Next, the system controller 103 transmits this obtained present position data to the server 21 through the portable telephone station 28 and the internet 25 (step S4).

The server 21 extracts the map data for display by accessing the map database 23 on the basis of the received present position data. In more detail, the server terminal 24 determines a display range having a predetermined distance in the north and south direction with the coordinate of the present position data, which is received from the portable terminal 29, as a center. Then, the server terminal 24 obtains the points (nodes), the roads (links), the names of the places and the names of the facilities, which belong to the display range, by referring to the respective tables of the map database 23, and then transmits those to the portable terminal 29 through the internet 25 and the portable telephone station 28 (step S6).

The map data for display includes the data for prescribing the outline of the display range. For example, in the case that the display range is prescribed by a rectangle having the predetermined distance in the north and south direction with the present position as the center, the map data for display include the coordinates data (i.e., the latitudes and the longitudes) of the 4 corners of the rectangle prescribing the display range. As another example, in case that the display range is prescribed by a circle having a predetermined radius with the present position as the center, the map data for display include the coordinates of the present position, which is the center of the circle as well as the data indicative of the predetermined radius. Therefore, the server terminal 24 extracts the points, the roads, the names of the facilities, the names of the places of the like in the map database 23 by using the above described data prescribing the display range, and transmits them as the map data for display. In addition, as a method prescribing the display range, various methods may be employed other than the above mentioned method prescribing the display range by the rectangular or the circle.

Figure 8A:
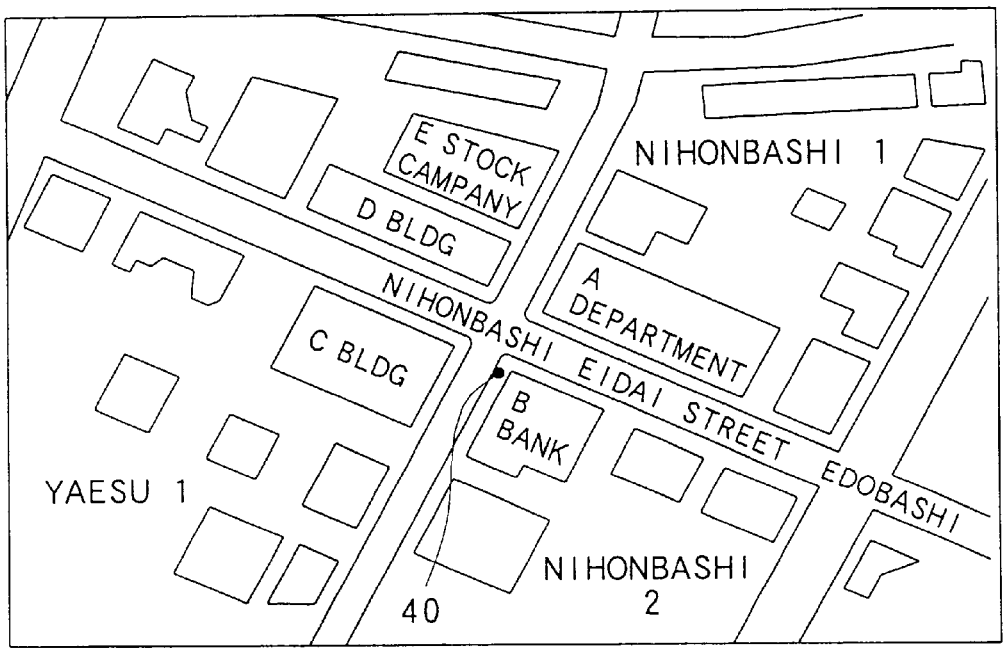
FIG. 8A is a diagram showing one example of the map display in the first embodiment.

The system controller 103 in the portable terminal 29 receives the map data for display and displays it on the screen of the display 95 (step S8). One example of the map data in this case is shown in FIG. 8A. In the example shown in FIG. 8A, the area within the rectangular with the present position mark 40 (indicated by a black dot) as the center thereof is prescribed as the display range, and the map within the display range is displayed. In the displayed map, the names of the facilities and the names of the places are also displayed in the display range.

Next, the system controller 103 performs the forecast displaying process (step S10). Here, the "forecast displaying process" is such a process of displaying what kind of facility or what kind of place will exist in a range located in the advancing direction of the user, which is not displayed in the presently displayed map. This forecast displaying process will be described later in detail.

Then, the system controller 103 judges whether or not the user instruct an end of the map displaying process (step S12). If the instruction indicative of the end of the map displaying process is inputted (step S12: YES), the process is ended. On the other hand, if the instruction indicative of the end is not inputted (step S12: NO), the system controller 103 accesses the navigation unit 93 and updates the present position data (step S14).

Next, the system controller 103 judges whether or not the updated present position is within the present display range (step S16). As described before, since the present display range is prescribed by the coordinates of the 4 corners or the like, the system controller 103 recognizes the display range at the moment. Thus, the system controller 103 performs this judgment by comparing the coordinates of the updated present position with the data of the present display range.

If the updated present position is within the present display range (step S16: YES), the system controller 103 moves the present position mark 40 on the screen so as to update the present position (step S18). On the other hand, if the updated present position is not within the present display range (step S16: NO), the operational flow returns to the step S4, so that the system controller 103 obtains the new map data for display by transmitting the updated present position data to the server 21. In this manner, as the user moves, the updating of the present position on the screen is performed. Further, if the user has gone beyond the present display range, the new map data is automatically obtained from the server 21, and is displayed. Thus, the user can be continuously informed of the map information around the present position.

As one option, in case that the user has gone beyond the present display range, instead of automatically obtaining the new map data, the portable terminal 29 may obtain the new map data after the user instructs the portable terminal 29 to access the server 21. This can be realized by modifying the processing program stored in the ROM 101 to do so. Since the access from the portable terminal 29 carried by the user to the server 21 may require some expense as it accompanies the communicating process such as connecting with the provider, the above mentioned option (in which the portable terminal 29 firstly informs the fact that the user goes beyond the present display range, and then does not start obtaining the new map until the user instructs to obtain the new map data) may be beneficial.

Next, the forecast displaying process (at the step S10 in FIG. 6) is explained. The forecast displaying process is a process of displaying lists of the names of the facilities and the places existing in the range, which is located in the advancing direction and which is outside of the present display range, when the present position of the user moves to the vicinity of the edge of the present display range on the screen of the portable terminal 29. The forecast displaying process may include a process of automatically displaying the map around a selected facility or a selected place when the user selects one or some of the names of the facilities or the places in the list. Hereinafter, the forecast displaying process is explained with reference to FIG. 7 to FIG. 10B.

Figure 10A:
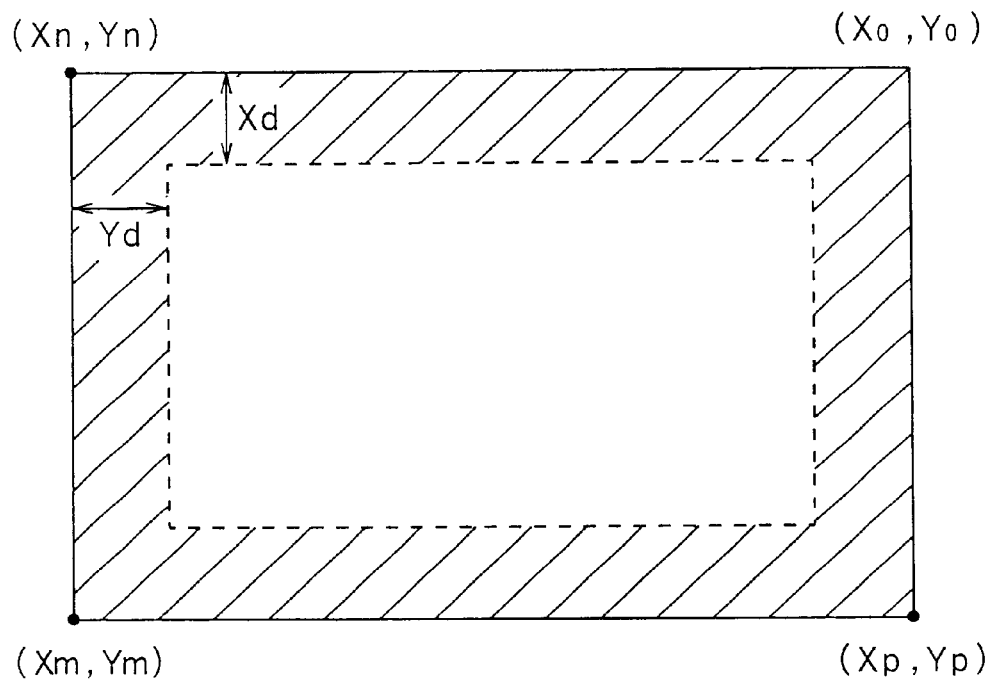
FIG. 10A is a diagram for explaining a forecast display area in the first embodiment.

In the forecast displaying process, at first, it is judged whether or not the present position of the user moves to be within the "forecast display range" (step S20). Here, the "forecast display range" may be a peripheral or surrounding portion of the present display range, for example. Namely, as shown in FIG. 10A, the surrounding portion of the present display range (e.g., the range distant from the outline by the latitude Xd and the longitude Yd, which is indicated as a hatched area) may be set as the forecast display range. As mentioned before, since the system controller 103 recognizes the coordinates of the 4 corners of the present display range, it is possible to perform this judgment by calculating whether nor not the present position coordinates supplied by the navigation unit are within the forecast display range.

If it is judged that the present position is within the forecast display range (step S20: YES), the system controller 103 determines the advancing direction of the user (step S22). This may be performed by storing the history of the change of the present position data, which is periodically updated at the map displaying process shown in FIG. 6, in the RAM 10 and then referring to such a stored history.

Next, the system controller 103 determines a search range having a predetermined shape and size in the range, which is located in the advancing direction of the user, on the basis of the present position and the advancing direction, and then transmits the determined search range to the server 21 (step S24). This search range may be determined as a range distant from the present position by a predetermined latitude and a predetermined longitude. For example, in case that the latitude of the present position is Xa and the longitude of the present position is Ya, the area having the latitude of (Xa+α) to (Xa+β) and the longitude of (Ya+α) to (Ya+β) may be set as the search range (wherein α>β).

Next, the server 21 refers to the map database 23 on the basis of the received information indicative of the search range so as to extract the names of the facilities and the names of the places existing within the search range (hereinafter, which is referred to as "forecast display information"). Then, the server 21 transmits the extracted forecast display information to the portable terminal 29 (step S26).

Figure 8B:
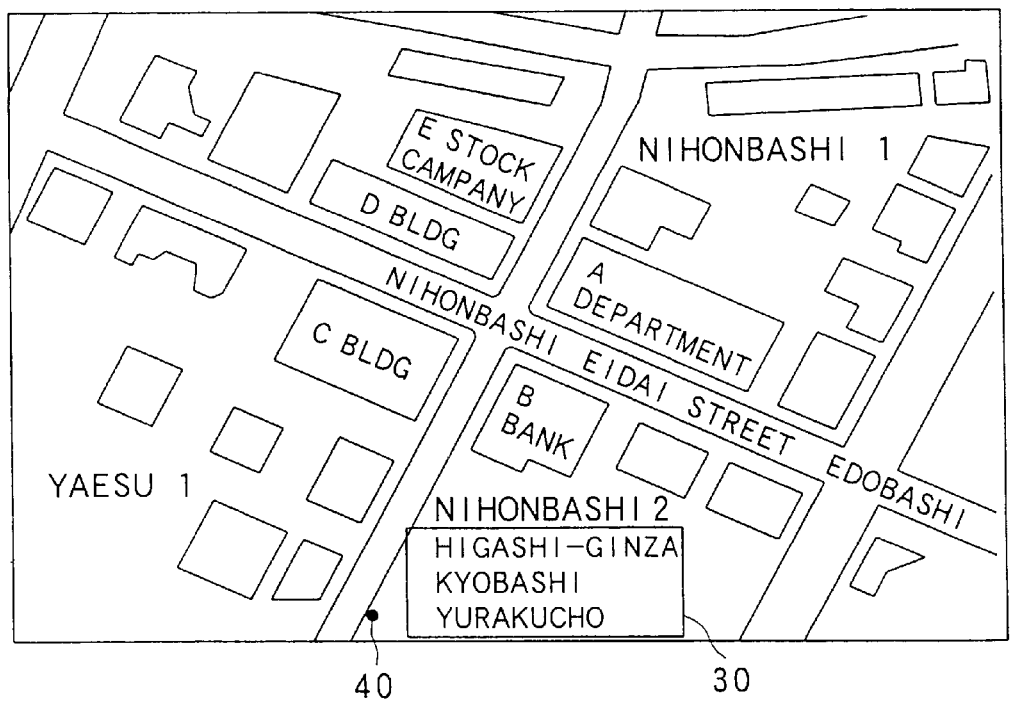
FIG. 8B is a diagram showing another example of the map display in the first embodiment.

The system controller 103 in the portable terminal 29 displays the forecast display information received from the server 21 on the screen of the display 95 to thereby perform forecast displaying (step S28). One example of a forecast display is shown in FIG. 8B. In FIG. 8B, the present position mark 40 proceeds to the bottom edge of the displayed map, which implies that the user advances to a point corresponding to the bottom edge of the display range. A forecast display 30 is superimposed (or window-displayed) on the displayed map at the position near the present position mark 40 of the user. By this forecast display 30, the user can recognize the names of the main facilities and the names of the main places, which are located in the currently advancing direction of the user. Therefore, it is easy for the user to recognize whether or not his destination is located in the currently advancing direction. In addition, it is also possible to display the forecast display 30 at any position other than the position near the present position mark 40.

Figure 9A:
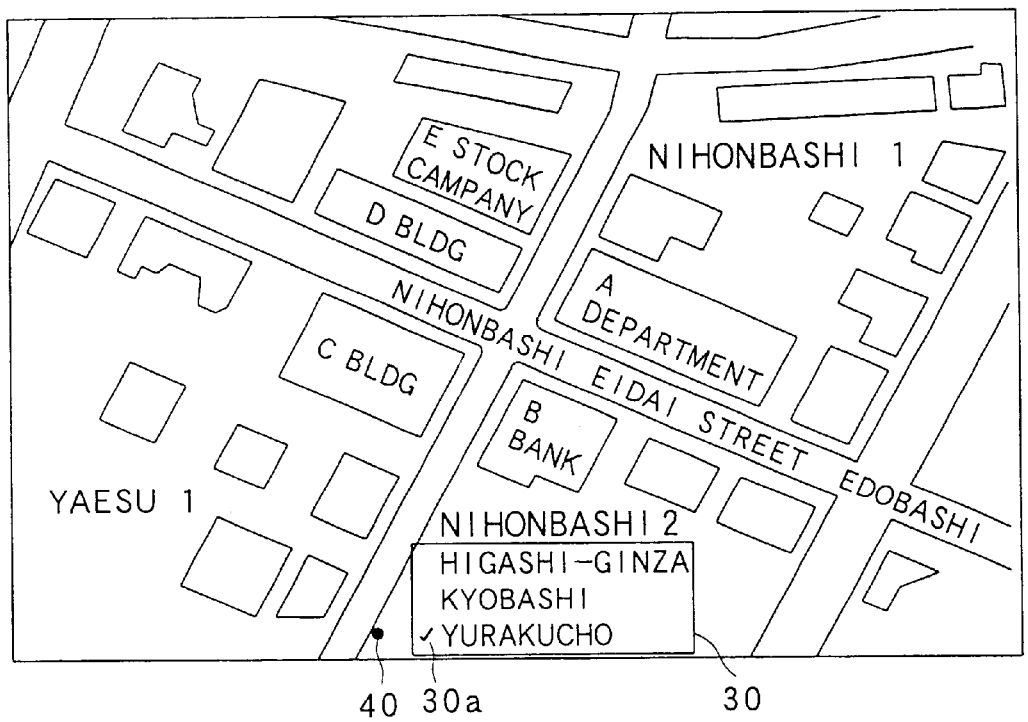
FIG. 9A is a diagram showing another example of the map display in the first embodiment.

Next, the system controller 103 judges whether or not the user selects one of the names of the facilities and the names of the places in the forecast display (hereinafter, these names to be selected are called as simply "items" and each of them is called simply as an "an item") (step S30). The forecast display is displayed so that the user can select any one of the items in the forecast display. Such a selection of the item in the forecast display may be performed by operating the operation switch 98 of the portable terminal 29 or by using the voice input unit 99. FIG. 9A shows a display image when the user selects the item "Yurakucho" in the forecast display in FIG. 8B. In FIG. 9A, a check mark 30a is displayed on the left side of the item "Yurakucho" within the forecast display 30.

If no item is selected in the forecast display (step S30: NO), the forecast display process is ended. On the other hand, if one of the items is selected (step S30: YES), the system controller 103 transmits the information indicative of the selected item to the server 21 (step S32). The server 21 accesses each table in the map database 23 and searches the item. Then, the server 21 transmits the map information surrounding the item to the portable terminal 29 (step S34).

Figure 9B:
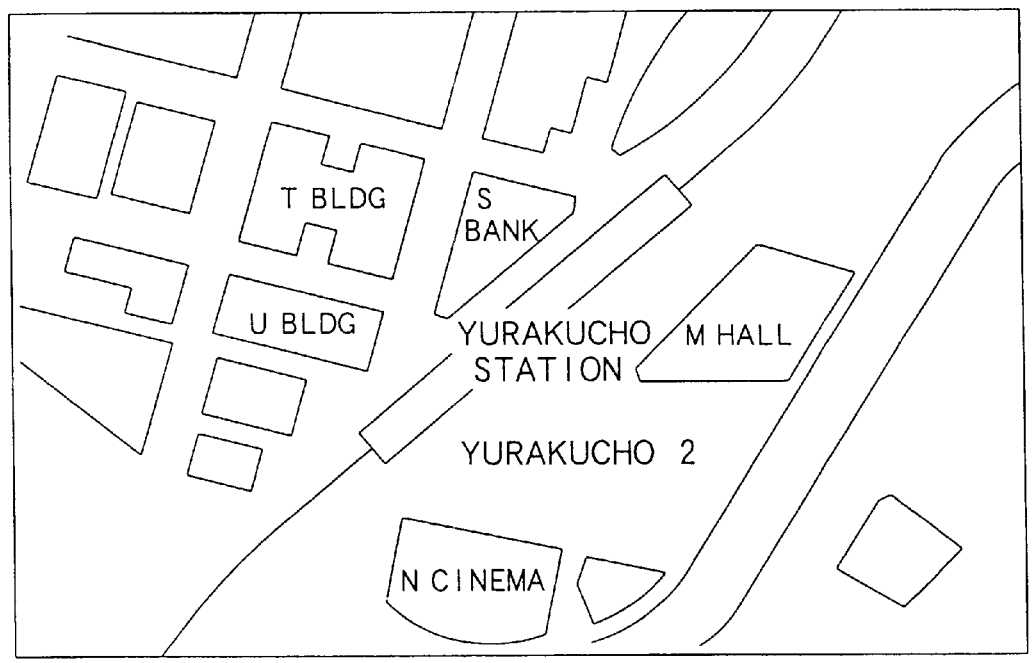
FIG. 9B is a diagram showing another example of the map display in the first embodiment.

The portable terminal 29 displays the received map information on the screen of the display 95 (step S36). One example of the display in this occasion is shown in FIG. 9B. In this example, the map information surrounding "Yurakucho" is displayed as a result of the user's selection of the item "Yurakucho" in the forecast display 30 in FIG. 9A.

After that, the system controller 103 changes this map display shown in FIG. 9B on the display 95 back to the normal map display shown in FIG. 8B (step S36). In this case, as one method, the system controller 103 may control the display 95 to display the map surrounding the item at the step S34 for a predetermined time period and then change it back to the normal map display automatically after the elapse of this time period. Alternatively, the system controller 103 may control the display 95 to display the map surrounding the item at the step S34 until an instruction to stop it is inputted by the user, and then change it back to the normal map display when the this instruction is inputted.

Next, the system controller 103 judges whether or not the user selects another item in the forecast display 30 (step S38). If another item is selected (step S38: YES), the operation flow returns to the step S32. On the other hand, if another item is not selected (step S38: NO), the forecast display is ended.

As described above, by the forecast display, when the present position of the user approaches the edge portion of the present display range, the name of the facilities, the name of the places and the like which are located in the currently advancing direction of the user, are automatically displayed. Therefore, the user can easily judge whether the currently advancing direction is correct or incorrect. Further, when the user selects the item of his or her interest from-the displayed items e.g., the names of the facilities, the names of the places and the like, the map surrounding the selected item is automatically displayed. Therefore, the user can easily watch the map surrounding the point of his or her interest such as a destination of his or her trip.

In the above explanation, although the system controller 103 in the portable terminal 29 performs the determination of the search range, the server 21 may perform this determination. In that case, the system controller 103 transmits the present position data and the advancing direction data to the server 21. The server 21 receives those transmitted data, determines the search range on the basis of those received data, and transmits the extracted map information to the portable terminal 29.

The above explained first embodiment is constructed such that the forecast display is performed when the present position of the user enters the forecast display range. Instead of or in addition to such a structure, it may by constructed such that, when the user specifies a desired point and a desired advancing direction by using the operation switch 98 or the voice inputting unit 99 of the portable terminal 29, the forecast display from the specified point in the specified advancing direction is performed.

Next, an on-vehicle type navigation apparatus as a second embodiment is explained. The structure of the on-vehicle type navigation apparatus is essentially same as that of the portable terminal 29 in the first embodiment shown in FIG. 5. Different from the portable terminal 29, the map information stored in the database 23 within the server 21 of FIG. 1 is included in the navigation unit 93 in the form of ROM in case of the on-vehicle type navigation apparatus. Since it is not necessary for the on-vehicle type navigation apparatus to communicate with the server through the portable telephone station or the internet, the structure shown in FIG. 1 or the transmitter and receiver 106 shown in FIG. 5 is not required in the on-vehicle type navigation apparatus. The on-vehicle type navigation apparatus is a built-in or self-sustaining type system having the respective constitutional elements (except the transmitter and receiver 106) shown in FIG. 5. Thus, the controls of the whole processes are performed by the system controller 103, on the basis of the programs stored in the ROM 11.

In case of the on-vehicle type navigation apparatus, the map is normally displayed on the display such that the present position is positioned at a center thereof. In case of the above described first embodiment, since the map data is stored on the side of the server 21, the map display is performed in the form of a so-called page turning type. Namely, the map data of a certain display range is downloaded from the server one after another, and the same map is continuously displayed until the user enters a next display range, and the map for the next display range is displayed when the user enters the next display range by accessing the server 21. In contrast, in case of the on-vehicle type navigation apparatus, since the map information is stored in the ROM, the map information is updated frequently so as to display the present position always at the center thereof. Therefore, the present position cannot be within the edge portion of the display range as in the first embodiment.

Figure 10B:
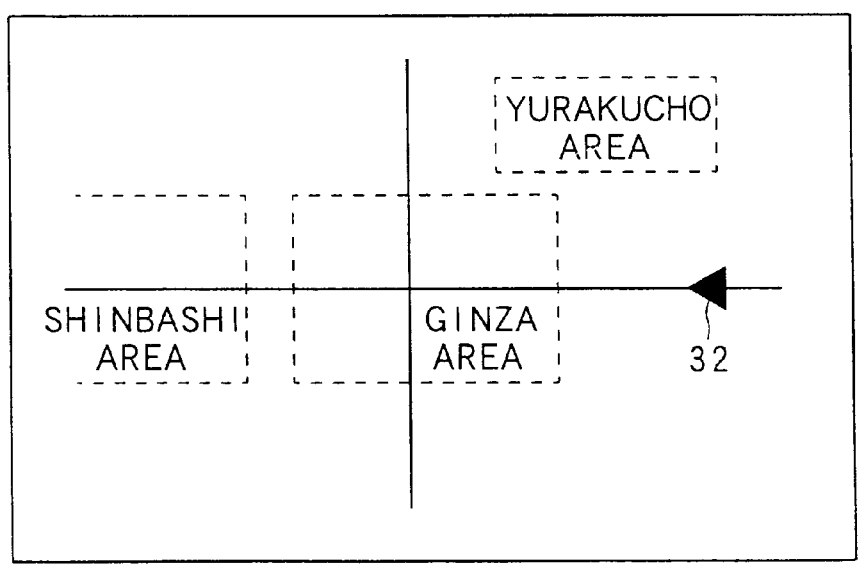
FIG. 10B is a diagram for explaining one example of the forecast display area in a second embodiment of the present invention.

Thus, in case of the on-vehicle type navigation apparatus, as shown in FIG. 10B, certain areas are set in advance on the map, and the information indicative of those area is stored together with the map data in the ROM. Then, when the present position of the self vehicle enters either one of those areas, the forecast display is performed. For example, in the example shown in FIG. 10B, a plurality of areas such as "Ginza area", "Yurakucho area", "Shinbashi area" and the like are set in advance in the vicinity of Ginza. Those respective areas are prescribed by the position information (latitude and longitude) of 4 corners thereof. When the present position of the self vehicle enters either one of those areas, the forecast display information is generated by searching the names of the facilities and the names of the places as for the predetermined range, which is located from this area (which the present position has just entered) in the currently advancing direction.

In this case, for example, in the example shown in FIG. 10B, the condition for performing the forecast display is fulfilled when the present position 32 of the vehicle enters the Ginza area. Since the advancing direction of the self-vehicle is grasped by the navigation unit, the system controller searches the name of facilities and the names of the places within the predetermined search range, which is located in the advancing direction from the Ginza area. Then, the system controller generates the forecast display information, and generates it on the screen. Such a feature that the map information surrounding the selected item is displayed in case that one of the items in the forecast display information is selected is the same as the first embodiment.

By this, it is possible to perform the forecast display in the on-vehicle navigation apparatus. Hence, the user can recognize whether the advancing direction of the self vehicle is correct or incorrect while traveling the self vehicle. Further, by selecting a certain item in the forecast display, it is possible for the user to easily watch the map surrounding the selected item.

Further, it is possible to apply the present invention to a system for searching and displaying the map information on the terminal apparatus such as a personal computer as another embodiment. More concretely, it is possible to apply the present invention to a map searching software which is operated on a terminal of stand alone type, or a map searching service which is supplied on a network by using the internet or the like.

In case of the map searching software, the map data explained with reference to FIG. 2 to FIG. 4B is prepared in a form of a CD-ROM or the like, and the necessary data is obtained by accessing it. On the other hand, in case of the map searching service on the network, the map information is stored in the server 21 as shown in FIG. 1, and the user terminal 27 accesses it.

In either case, the difference from the aforementioned portable terminal or on-vehicle type navigation apparatus is that the present position of the user does not move. Thus, in place of the present position actually measured by the GPS or the like in the above embodiment, the user specifies an arbitrary geographical point and the map display is performed with respect to the specified point as the present position. Further, in case of performing the forecast display, for example, the user specifies an arbitrary geographical point as well as an arbitrary advancing direction, the search range is determined on the basis of those specified point and direction. Then, the forecast display information is obtained and displayed by referring to the map data.

In the above explanation, the information displayed by the forecast display information is the names of the facilities and the names of the places. However, the present invention is not limited to this. For example, in addition to or in place of those names, the forecast display information may comprise attribute information within the link table (refer to FIG. 3B).

As described above in detail, according to the embodiments of the present invention, when the present position of the user approaches the edge portion of the display area which is currently displayed, the names of the facilities, the names of the places and the like which are located in the currently advancing direction of the user are automatically displayed. Therefore, it is possible for the user to easily judge whether the currently advancing direction is correct or incorrect in view of his or her destination. Further, when the item of his or her interest is selected from the items e.g., the name of the facilities and the names of the places displayed by the forecast display, the map surrounding the selected item is automatically displayed. Therefore, it is possible for the user to easily watch the map. surrounding the point of his or her interest such as his or her destination.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.11-308352 filed on Oct. 29, 1999 including the specification, claims, drawings and summary is incorporated herein by reference in its entirety.

What is claimed is:

1. A map displaying apparatus comprising:
   a memory device for storing map data including map data and name data;
   a map displaying device for displaying a map within a map display range by using the map data;
   a point determining device for determining one point or a plurality of points within the map display range displayed at the present time;
   a direction determining device for determining an advancing direction;
   a searching device for extracting the name data in the determined advancing direction, related to the determined point or points by searching the map data stored in said memory device; and
   a name displaying device for displaying the extracted name data by superimposing the extracted name data on the map displayed by said map displaying device.

2. A map displaying apparatus according to claim 1, further comprising a name specifying device for specifying one of the name data displayed by said name displaying device, wherein
   when one of the name data is specified by said name specifying device, said map displaying device displays the map around a point corresponding to the specified name.

3. A map displaying apparatus according to claim 1, further comprising a present position detecting device for detecting a present position of said map displaying apparatus, wherein
   said point determining device determines a point of the detected present position as the point within the map display range.

4. A map displaying apparatus according to claim 3, wherein the map display range is determined on the basis of the point of the detected present position.

5. A map displaying apparatus according to claim 3, further comprising:
   a judging device for judging whether the point of the detected present position is in a predetermined area within the map display range, wherein the name displaying device displays the extracted name data if the point of the detected present position is in the predetermined area within the map display range.

6. A map displaying apparatus according to claim 3, wherein said searching device extracts the name data included within a search range determined on the basis of the point of the detected present position and the determined advancing direction.

7. A map displaying apparatus according to claim 1, wherein said point determining device comprises a point specifying device through which the point or points within the map display range and the advancing direction can be specified by a user.

8. A map displaying apparatus according to claim 7, wherein said searching device extracts the name data included in a search range determined on the basis of the point and the advancing direction specified through said point specifying device.

9. A map displaying apparatus according to claim 1, wherein the map data comprises: node data indicating a point on the map; link data as the road data indicating a road on the map; and the name data indicating a name of a facility and a name of a place in correlation with the node data and the link data.

10. A map displaying method comprising:
    a map displaying process of displaying a map within a map display range by using map data store din a memory device for storing the map data including road data and name data;
    a point determining process of determining one point or a plurality of points within the map display range displayed at the present time;
    a direction determining process of determining an advancing direction;
    a searching process of extracting the name data in the determined advancing direction, related to the determined point or points by searching the map data stored in said memory device; and
    a name displaying process of displaying the extracted name data by superimposing the extracted name data on the map displayed by said displaying process.

11. A map displaying method according to claim 10, further comprising a name specifying process of specifying one of the name data displayed by said name displaying process, wherein
    when one of the name data is specified by said name specifying process, said map displaying process displays the map around a point corresponding to the specified name.

12. A map displaying method according to claim 10, further comprising a present position detecting process of continuously detecting a present position, wherein
    said point determining process determines a point of the detected present position as the point within the map display range.

13. A map displaying method according to claim 12, wherein the map display range is determined on the basis of the point of the detected present position.

14. A map displaying method according to claim 12, further comprising:
    ajudging process for judging whether the point of the detected present position is in a predetermined area within the map display range, wherein the name displaying process displays the extracted name data if the point of the detected present position is in the predetermined area within the map display range.

15. A map displaying method according to claim 12, wherein said searching process extracts the name data included within a search range determined on the basis of the point of the detected present position and the determined advancing direction.

16. A map displaying method according to claim 10, wherein said point determining process comprises a point specifying process through which the point or points within the map display range and the advancing direction can be specified by a user.

17. A map displaying method according to claim 16, wherein said searching process extracts the name data included in a search range determined on the basis of the point and the advancing direction specified through said point specifying process.

18. A map displaying method according to claim 10, wherein the map data comprises: node data indicating a point on the map; link data as the road data indicating a road on the map; and the name data indicating a name of a facility and a name of a place in correlation with the node data and the link data.

19. A server connected to a user terminal through a network comprising:
- a memory device for storing map data including road data and name data;
- a point receiving device for receiving one point or a plurality of points transmitted from the user terminal through the network, wherein the point or points reflect a point or points within a map display range displayed at the present time in the user terminal;
- a direction receiving device for receiving an advancing direction transmitted from the user terminal through the network;
- a searching device for extracting the name data in the received advancing direction related to the received point or points by searching the map data stored in said memory device; and
- transmitting device for transmitting the extracted name data to the user terminal through the network.

20. A server according to claim 19, wherein said searching device extracts the name data included within a search range determined on the basis of the received point or points and the received advancing direction.

* * * * *

UNITED STATES PATENT AND TRADEMARK OFFICE
CERTIFICATE OF CORRECTION

PATENT NO.   : 6,462,676 B1
DATED        : October 8, 2002
INVENTOR(S)  : Isao Koizumi It is certified that error appears in the above-identified patent and that said Letters Patent is hereby corrected as shown below:

Title page,
Item [57], ABSTRACT,
Line 3, after "data;" delete the period.

Column 14,
Line 14, "store din" should read -- stored in --.
Line 49, "ajudging" should read -- a judging --.

Signed and Sealed this

Fourth Day of February, 2003

JAMES E. ROGAN
*Director of the United States Patent and Trademark Office*